(12) United States Patent
Xia

(10) Patent No.: US 12,402,756 B2
(45) Date of Patent: Sep. 2, 2025

(54) COMBINED RICE-WASHING DEVICE OF COOKING ROBOT, AND RICE WASHING PROCESS

(71) Applicant: FOSHAN FANXIAOER RICE COOKING ROBOT TECHNOLOGY CO., LTD., Guangdong (CN)

(72) Inventor: Jinsheng Xia, Foshan (CN)

(73) Assignee: FOSHAN FANXIAOER RICE COOKING ROBOT TECHNOLOGY CO., LTD., Guangdong (CN)

( * ) Notice: Subject to any disclaimer, the term of this patent is extended or adjusted under 35 U.S.C. 154(b) by 26 days.

(21) Appl. No.: 18/253,564

(22) PCT Filed: Nov. 16, 2021

(86) PCT No.: PCT/CN2021/131021
§ 371 (c)(1),
(2) Date: May 18, 2023

(87) PCT Pub. No.: WO2022/105767
PCT Pub. Date: May 27, 2022

(65) Prior Publication Data
US 2023/0414043 A1 Dec. 28, 2023

(30) Foreign Application Priority Data
Nov. 18, 2020 (CN) .......................... 202011290818.3

(51) Int. Cl.
*A47J 44/00* (2006.01)
*A47J 36/32* (2006.01)
(Continued)

(52) U.S. Cl.
CPC .............. *A47J 44/00* (2013.01); *A47J 36/32* (2013.01); *A47J 43/24* (2013.01); *B08B 3/102* (2013.01);
(Continued)

(58) Field of Classification Search
CPC . A47J 44/00; A47J 36/32; A47J 43/24; B08B 13/00; B08B 3/02; B08B 3/102; Y02A 40/90
See application file for complete search history.

(56) References Cited

U.S. PATENT DOCUMENTS 3,510,108 A * 5/1970 Yego, Jr. ................. A23N 12/02
210/474
4,184,775 A 1/1980 Akizawa
(Continued)

FOREIGN PATENT DOCUMENTS

CN 102151068 A 8/2011
CN 103815770 A 5/2014
(Continued)

OTHER PUBLICATIONS

International Search Report issued for International Patent Application No. PCT/CN2021/131021, Date of mailing: Feb. 14, 2022, 8 pages including English translation.
(Continued)

*Primary Examiner* — Benjamin L Osterhout
(74) *Attorney, Agent, or Firm* — HSML P.C.

(57) ABSTRACT

A combined rice-washing device of a cooking robot includes a fixing pipe, a driving sleeve, a driving assembly, a telescopic assembly, a water feeding/discharge assembly and a control assembly, wherein the telescopic assembly comprises a telescopic pipe slidably connected to the driving sleeve, a lead screw nut connected to the inner wall of the telescopic pipe, and a hollow lead screw mating with the lead screw nut; a guided sliding portion is provided between the telescopic pipe and the driving sleeve, and an end of the telescopic pipe is connected to a rice washing and stirring assembly; and the hollow lead screw is provided with a
(Continued)

sealing groove, and a sealing member that abuts against the telescopic pipe is arranged in the sealing groove.

10 Claims, 5 Drawing Sheets

(51) Int. Cl.
  *A47J 43/24*    (2006.01)
  *B08B 3/10*     (2006.01)
  *B08B 13/00*    (2006.01)
  *B08B 3/02*     (2006.01)

(52) U.S. Cl.
  CPC ............... *B08B 13/00* (2013.01); *B08B 3/02* (2013.01); *Y02A 40/90* (2018.01)

(56) References Cited

U.S. PATENT DOCUMENTS

| | | | | |
|---|---|---|---|---|
| 4,756,323 A * | 7/1988 | Horton | ............ | A47J 43/24 73/426 |
| 5,119,721 A * | 6/1992 | Satake | ............ | B02B 1/06 99/600 |
| 5,156,082 A * | 10/1992 | Fukuda | ............ | G05D 23/1951 99/403 |
| 5,184,544 A * | 2/1993 | Ling | ............ | B01D 11/0273 99/511 |
| 5,778,769 A * | 7/1998 | Dodson | ............ | A47J 43/24 99/511 |
| 6,000,321 A * | 12/1999 | Maruyama | ............ | A47J 43/24 134/155 |
| 6,161,473 A * | 12/2000 | Suzuki | ............ | B02B 1/04 366/279 |
| 2012/0260957 A1 * | 10/2012 | Lee | ............ | A47J 43/24 134/56 R |
| 2019/0000265 A1 * | 1/2019 | Long | ............ | B01F 35/423 |
| 2019/0014809 A1 * | 1/2019 | Kawashima | ............ | B08B 3/14 |
| 2022/0386801 A1 * | 12/2022 | Ko | ............ | A47J 43/24 |

FOREIGN PATENT DOCUMENTS

| | | |
|---|---|---|
| CN | 104814666 A | 8/2015 |
| CN | 105877466 A | 8/2016 |
| CN | 107581938 A | 1/2018 |
| CN | 207640126 U | 7/2018 |
| CN | 109247840 A | 1/2019 |
| CN | 109247841 A | 1/2019 |
| CN | 209091048 U | 7/2019 |
| CN | 209566324 U | 11/2019 |
| CN | 110664218 A | 1/2020 |
| CN | 110664219 A | 1/2020 |
| CN | 211384982 U | 9/2020 |
| CN | 111758932 A | 10/2020 |
| CN | 112493825 A | 3/2021 |
| CN | 215348312 U | 12/2021 |
| GB | 191015117 A | 3/1911 |
| GB | 2486872 A | 7/2012 |
| JP | S50125070 A | 10/1975 |
| JP | H05247 A | 1/1993 |
| JP | H11290224 A | 10/1999 |
| JP | 2020005669 A | 1/2020 |
| JP | 2020006151 A | 1/2020 |

OTHER PUBLICATIONS

Written Opinion issued for International Patent Application No. PCT/CN2021/131021, Date of mailing: Feb. 14, 2022, 6 pages including partial English machine translation.
Decision to Grant a Patent issued for Japanese Patent Application No. 2023-552380, Dispatch date: Apr. 2, 2024, 5 pages including English machine translation.
Office Action issued for Chinese Patent Application No. 202011290818. 3, dated Sep. 5, 2024, 6 pages.

* cited by examiner

COMBINED RICE-WASHING DEVICE OF COOKING ROBOT, AND RICE WASHING PROCESS

CROSS-REFERENCE TO RELATED APPLICATIONS

This application is an U.S. national phase application under 35 U.S.C. § 371 based upon international patent application No. PCT/CN2021/131021, filed on Nov. 16, 2021, which itself claims priority to Chinese patent application No. 2020112908183 filed on Nov. 18, 2020. The contents of the above identified applications are hereby incorporated herein in their entireties by reference.

TECHNICAL FIELD

The present disclosure relates to the technical field of rice cooking robots, in particular to a combined rice-washing device for a rice cooking robot and a rice washing process.

BACKGROUND

With the development of science and technology, more and more electrical appliances are configured with intelligent modules, and rice cooking robots are increasingly favored by the younger generation as an artifact to replace conventional rice cookers. The rice cooking robot can automatically feed water, wash rice, drain water and cook rice at an appointed time, which solves the problem of poor rice taste caused by the need to wash rice manually in the prior art and soak rice in water for a long time until the appointed cooking time. It can be seen that a rice washing device and a water feeding and draining device are important components related to the experience of using the rice cooking robot.

In the prior art, the rice washing and the water feeding and draining device are integrated in the rice cooker. The rice washing device and the water feeding and draining device are generally driven separately, for example, a motor drives a lifting device to drive the water feeding and draining device to move up and down to feed and drain water. Another driving device drives the rice washing device to rotate to wash the rice, which has a complex structure and takes up a large space, and increases a difficulty of assembly and maintenance. An efficiency of rice washing and feeding and draining water is low, and the control is relatively complicated.

SUMMARY

The technical problem to be solved by the present disclosure is to provide a combined rice-washing device for a rice cooking robot and a rice washing process, which can realize synchronous process of feeding and draining of water and washing rice, and has a good rice washing effect, and has a compact structure and a good appearance.

In order to solve the above technical problem, the present disclosure provides a combined rice-washing device for a rice cooking robot, which includes a fixing tube, a driving sleeve received in the fixing tube, a driving assembly configured to drive the driving sleeve to rotate, a telescopic assembly slidable relative to the driving sleeve, a water feeding and draining assembly connected to the telescopic assembly, and a control assembly configured to control the driving assembly and the water feeding and draining assembly. The telescopic assembly comprises a telescopic tube slidably connected to the driving sleeve, a lead screw nut connected to an inner wall of the telescopic tube, and a hollow lead screw cooperating with the lead screw nut; a guide sliding portion is provided between the telescopic tube and the driving sleeve, and an end of the telescopic tube is connected to a rice washing and stirring assembly. The hollow lead screw is provided with a sealing groove, and a sealing member abutting against the telescopic tube is provided in the sealing groove.

As an improvement of the above technical solution, an outer wall of the driving sleeve is provided with a gear ring, and the driving assembly comprises a motor and a gear assembly driven by the motor, and the gear ring is provided in cooperation with the gear assembly.

As an improvement of the above technical solution, the gear assembly comprises a worm connected to the motor, a worm gear engaged with the worm, a first gear coaxially arranged with the worm gear, and a second gear engaged with the first gear, and the second gear is engaged with the gear ring.

As an improvement of the above technical solution, a lower end of the fixing tube is provided with a mounting sleeve, the mounting sleeve is provided with a notch, and the second gear is engaged with the gear ring through the notch. A side of the mounting sleeve is provided with a mounting platform, and the mounting platform is provided with a plurality of mounting shafts configured to mount the worm gear, the first gear and the second gear.

As an improvement of the above technical solution, the guide sliding portion comprises a chute provided on an inner wall of the driving sleeve and a slider provided on an outer wall of the telescopic tube, the chute is provided in cooperation with the slider.

As an improvement of the above technical solution, the chute is provided along an axial direction of the telescopic tube, and at least two chutes are provided.

As an improvement of the above technical solution, the rice washing and stirring assembly comprises a stirring seat connected to the end of the telescopic tube and a stirring blade provided on the stirring seat.

As an improvement of the above technical solution, the stirring seat is axially provided with a through hole, and a filter screen is provided in the through hole.

As an improvement of the above technical solution, the water feeding and draining assembly comprises a power element and a water feeding and draining pipe, and the hollow lead screw extends through the fixing tube and is in communication with the water feeding and draining pipe, and the water feeding and draining pipe is tightly connected to the hollow lead screw.

Correspondingly, the present disclosure also provides a rice washing process using the combined rice-washing device, which includes the following steps of:
  S1, controlling, by the control assembly, the driving assembly to start, and rotating the driving sleeve synchronously to drive the telescopic tube to rotate;
  S2, sliding, by the lead screw nut, downward along the hollow lead screw, driving the telescopic tube to slide downward relative to the driving sleeve until the rice washing and stirring assembly descends to a predetermined height;
  S3, controlling, by the control assembly, the water feeding and draining assembly to start, and feeding a predetermined amount of water into a container;
  S4, controlling, by the control assembly, the driving assembly to enable the telescopic tube to rotate, enabling the rice washing and stirring assembly to rotate and lift synchronously to perform one rice washing;

S5, after one rice washing is completed, controlling, by the control assembly, the water feeding and draining assembly to start, and draining the water in the container; and S6, repeating steps S3 to S5 until the rice washing is finished, and controlling, by the control assembly, the telescopic tube to reset.

The present disclosure has following beneficial effects:

In the present disclosure, the driving sleeve is driven to rotate through the driving assembly, the telescopic tube provided in cooperation with the driving sleeve and the lead screw nut connected to the telescopic tube are driven to rotate, and the hollow lead screw adapted to the lead screw nut is fixed to the fixing tube, so that the lead screw nut moves up and down along the hollow lead screw, the telescopic tube is driven to do reciprocating lifting motion. The lower end of the telescopic tube is connected to the rice washing and stirring assembly, and the rice washing and stirring assembly can rotate and lift with the telescopic tube synchronously, so as to achieve three-dimensional scanning rice washing, and improve efficiency and effect of rice washing. Water can be feed and drained through connecting the water feeding and draining pipe, the hollow lead screw and telescopic tube. The structure of the device is compact, the occupied space of the device is reduced, and the mounting and maintenance of the device are facilitated.

Further, the lower end of the fixing pipe is provided with the mounting sleeve, the gear ring is provided on the inner side of the mounting sleeve, the mounting sleeve is connected to the mounting platform, and the mounting platform is configured to mount the driving assembly. The mounting sleeve is also provided with the notch, the second gear of the driving assembly can extend through the notch to engage with the gear ring, thereby preventing impurities, dust, etc. from affecting a service life of the gear.

DETAILED DESCRIPTION OF THE EMBODIMENTS

Figure 1:
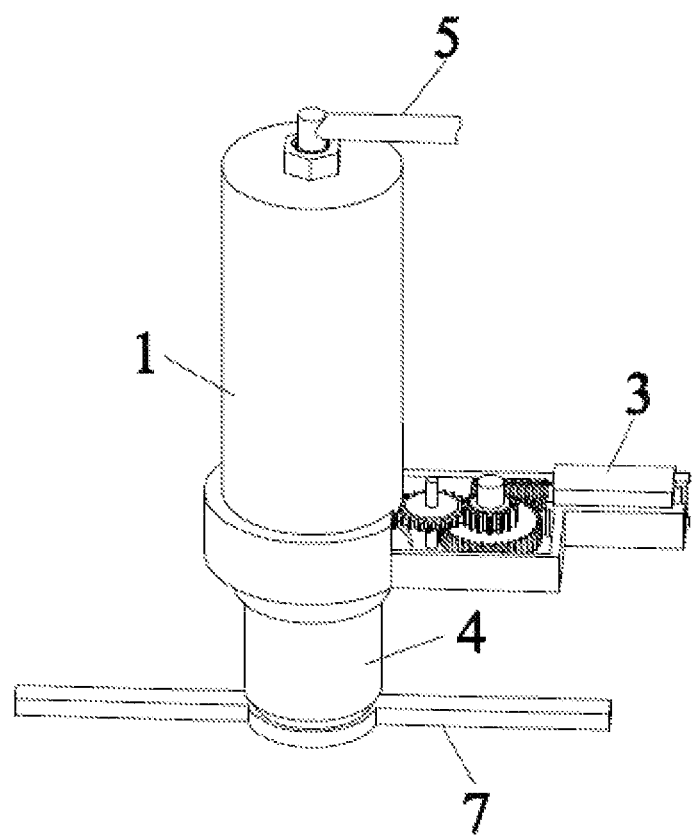
FIG. 1 is an overall schematic view of a combined rice-washing device of the present disclosure.

In order to make the object, technical solution and advantages of the present disclosure clearer, the present disclosure will be further described in detail below in conjunction with the accompanying drawings. It is only stated here that the terms for directions such as up, down, left, right, front, back, inside, and outside that appear or will appear in the text of the present disclosure are only based on the accompanying drawings of the present disclosure, and which are not specific limits to the present disclosure.

Referring to FIG. 1 to FIG. 5, the present disclosure provides a combined rice-washing device for a rice cooking robot, which includes a fixing tube 1, a driving sleeve 2 received in the fixing tube 1, and a driving assembly 3 that drives the driving sleeve 2 to rotate, a telescopic assembly 4 slidable relative to the driving sleeve 2, a water feeding and draining assembly 5 connected to the telescopic assembly 4, and a control assembly 6 that controls the driving assembly 3 and the water feeding and draining assembly 5.

The telescopic assembly 4 includes a telescopic tube 41 slidably connected to the driving sleeve 2, a lead screw nut 42 connected to an inner wall of the telescopic tube 41 and a hollow lead screw 43 cooperating with the lead screw nut 42. A guide sliding portion 44 is provided between the telescopic tube 41 and the driving sleeve 2, and an end of the telescopic tube 41 is connected to a rice washing and stirring assembly 7.

The hollow lead screw 43 is provided with a sealing groove 431, and a sealing member 45 abutting against the telescopic tube 41 is provided in the sealing groove 431.

The fixing tube 1 is mounted in the rice cooking robot, and the driving assembly 3 can drive the driving sleeve 2 to rotate relative to the fixing tube 1, thereby driving the telescopic assembly 4 to rotate. The telescopic tube 41 of the telescopic assembly 4 can reciprocate under an action of a lead screw pair, thereby driving the rice washing and stirring assembly 7 to rotate and lift with the telescopic tube 41 synchronously, so as to achieve three-dimensional scanning rice washing, and improve efficiency and effect of rice washing. Specifically, the inner wall of the telescopic tube 41 is connected to the lead screw nut 42, and the lead screw nut 42 cooperates with the hollow lead screw 43. An inner top surface of the fixing tube 1 is provided with a sleeve 11 extending downward. An inner wall of the sleeve 11 is axially provided with an engaging plane 111. A top portion of the hollow lead screw 43 is provided with a tangent plane 432 adapted to the engaging plane 111, so that the hollow lead screw 43 is fixed. When the driving sleeve 2 rotates, the telescopic tube 41 and the lead screw nut 42 rotate synchronously. The lead screw nut 42 also moves up and down along an axis of the hollow lead screw 43 to drive the telescopic tube 41 moves up and down along the guide sliding portion 44. An end of the telescopic tube 41 is connected to the rice washing and stirring assembly 7, so that the rice washing and stirring assembly 7 is synchronously lifted and rotated, so as to achieve three-dimensional rice washing, especially to fully clean the rice grains at a bottom of a container and improve the efficiency and effect of rice washing. In order to feed water and drain rice-washing water, the hollow lead screw 43 cooperates with the telescopic tube 41 to form a water feeding and draining channel 8, and the water feeding and draining assembly 5 is in communication with the hollow lead screw 43, so as to reliably feed and drain water. In the embodiment, by integrating the water feeding and draining assembly 5 with the telescopic assembly 4, the structure is compact, the occupied space of the device is reduced, and the mounting and maintenance of the device are facilitated.

In addition, in order to improve the sealing of the water feeding and draining channel 8, an outer wall of the hollow lead screw 43 is provided with the sealing groove 431, and the sealing member 45 is provided in the sealing groove 431. The sealing member 45 is capable of sealing a gap between the hollow lead screw 43 and the telescopic tube 41 to prevent water from entering the gap and causing poor drainage of a drainage assembly as well as problems such as bacterial growth caused by water accumulation and prolonged failure to drain.

Further, by controlling operating parameters of the driving assembly 3 and the water feeding and draining assembly 5 through the control assembly 6, an opening time of rice washing, a speed of rice washing, an amount of water entering and draining and times of water entering and drainage can be controlled, thereby improving the efficiency of rice washing and reducing the damage to rice grains by rice washing, and enhancing the taste of rice.

Figure 2:
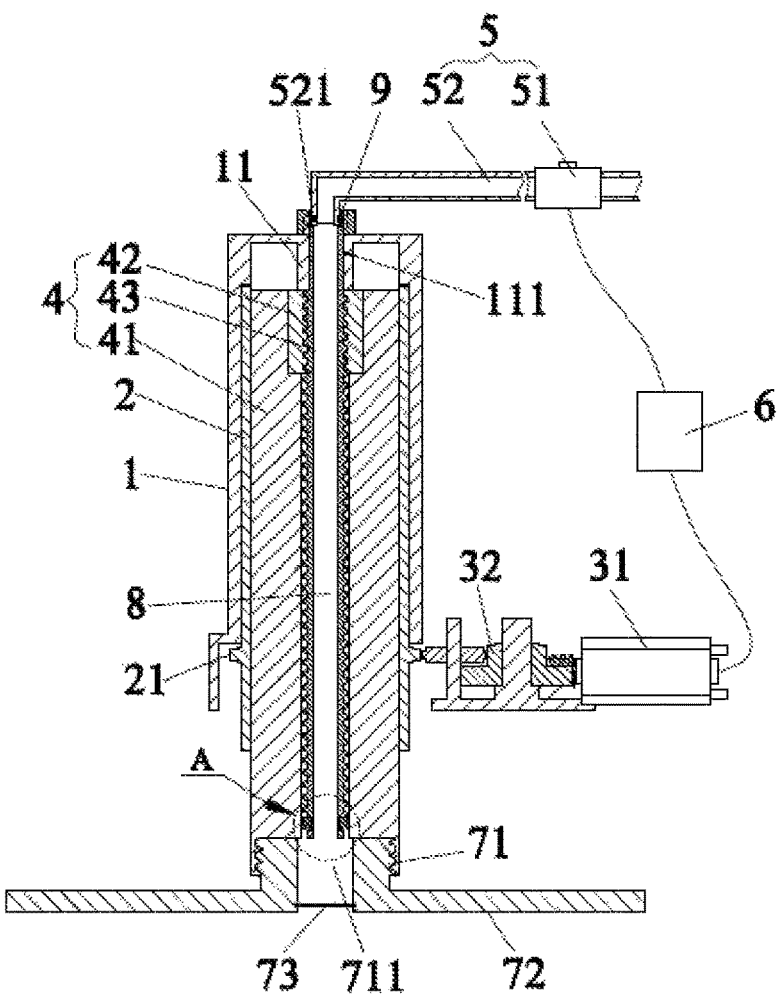
FIG. 2 is a cross-sectional view of a combined rice-washing device of the present disclosure.
Figure 3:
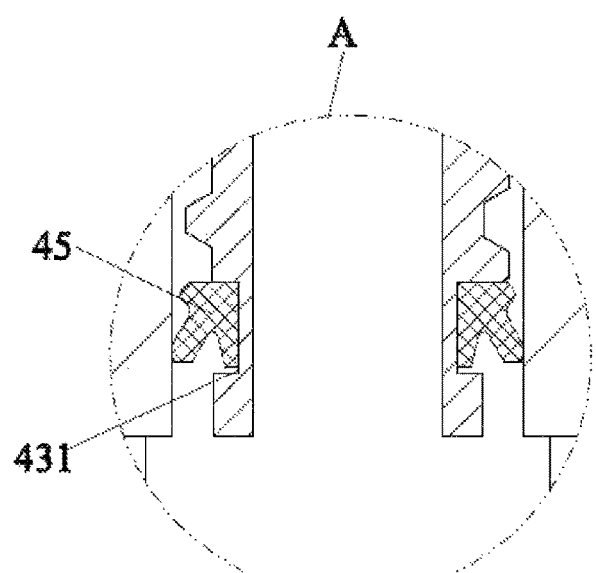
FIG. 3 is an enlarged view of portion A in FIG. 2.
Figure 6:
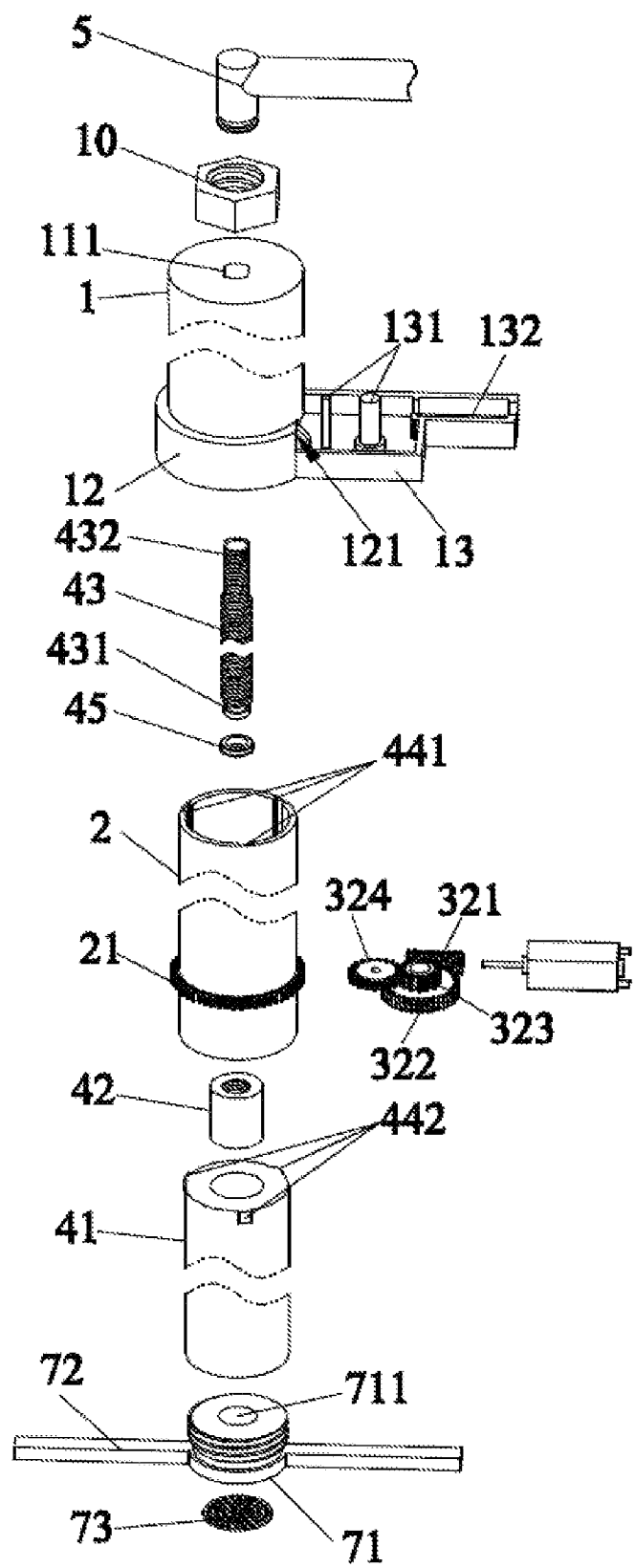
FIG. 6 is an exploded view of a combined rice-washing device of the present disclosure.

Referring to FIG. 2 and FIG. 6, in order to drive the driving sleeve 2 to move, an outer wall of the driving sleeve 2 is provided with a gear ring 21, and the gear ring 21 is integrally formed or rigidly connected to the driving sleeve 2. The driving assembly 3 includes a motor 31 and a gear assembly 32 driven by the motor 31. The gear ring 21 is provided in cooperation with the gear assembly 32. The motor 31 is provided on the outside of the driving sleeve 2, and the motor 31 drives the gear assembly 32 to rotate, thereby driving the gear ring 21 engaging with the gear assembly 32 to rotate. The gear assembly 32 can increase a torque of the driving assembly 3. In this embodiment, the gear assembly 32 includes a worm 321 connected to the motor 31, a worm gear 322 engaged with the worm 321, a first gear 323 coaxially arranged with the worm gear 322 and a second gear 324 engaged with the first gear 323. The second gear 324 is engaged with the gear ring 21, but not limited hereto.

Referring to FIG. 6, in order to facilitate the mounting of the driving assembly 3, a lower end of the fixing tube 1 is provided with a mounting sleeve 12. The mounting sleeve 12 is provided with a notch 121, and the second gear 324 is engaged with the gear ring 21 through the notch 121. A side of the mounting sleeve 12 is provided with a mounting platform 13. In the embodiment, in order to simplify the assembly process, the mounting sleeve 12 is integrally formed with the fixing tube 1. The gear ring 21 is located on an inner side of the mounting sleeve 12. The mounting platform 13 is provided on the side of the mounting sleeve 12, and a connection between the mounting sleeve 12 and the mounting platform 13 is provided with the notch 121, and a position of the notch 121 is adapted to a position of the gear ring 21, so that the second gear 324 can extend through the notch 121 and engage with the gear ring 21. The mounting platform 13 is provided with a plurality of mounting shafts 131 configured to mount the worm gear 322, the first gear 323 and the second gear 324, and the mounting platform 13 is also provided with a mounting groove 132 configured to mount the motor 31. The mounting platform 13 may also be provided with a cover plate (not shown in the drawings) to prevent impurities, etc. from affecting a service life of the gear assembly 32.

Figure 4:
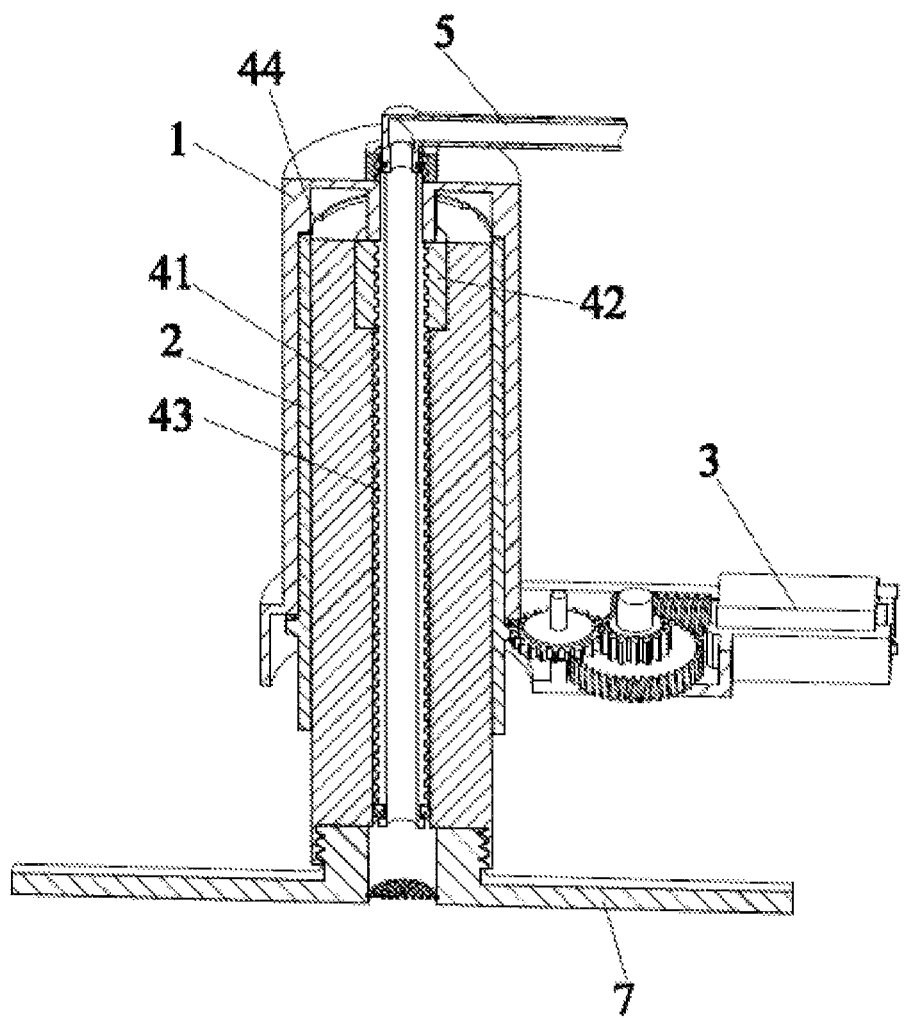
FIG. 4 is a view of a combined rice-washing device of the present disclosure in an initial state.
Figure 5:
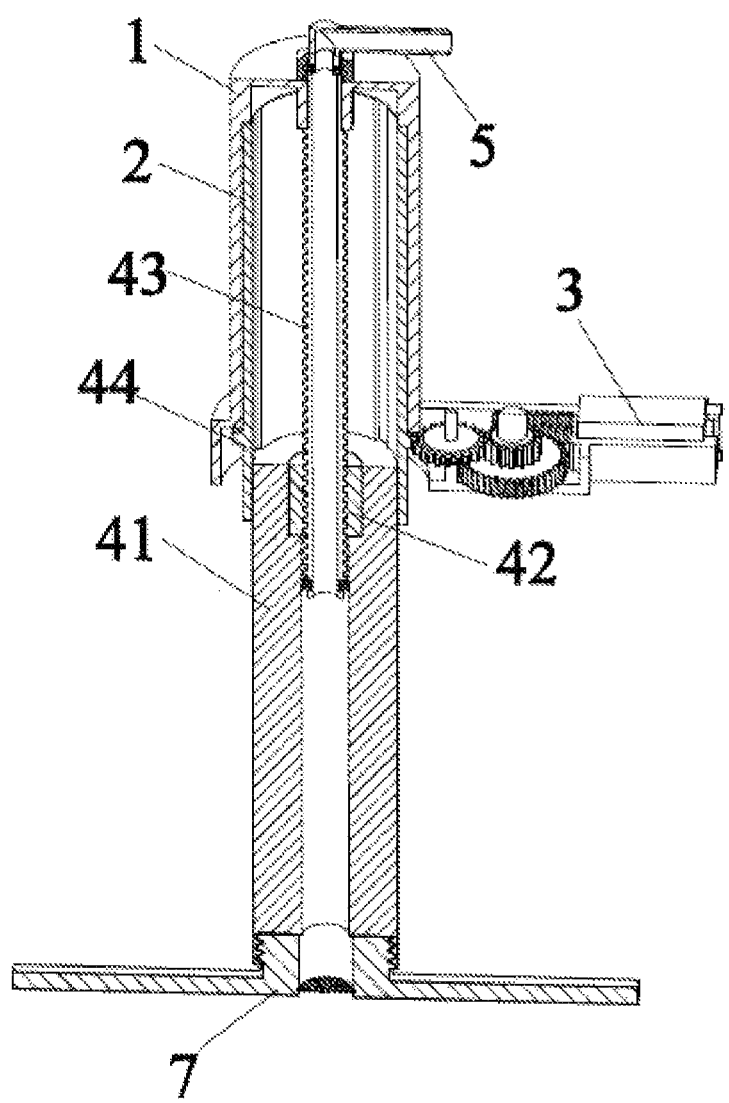
FIG. 5 is a view of a combined rice-washing device of the present disclosure in an operational state.

Referring to FIG. 4 to FIG. 6, the guide sliding portion 44 includes a chute 441 provided on an inner wall of the driving sleeve 2 and a slider 442 provided on an outer wall of the telescopic tube 41. The chute 441 is provided in cooperation with the slider 442. It should be noted that, in the embodiment, the guide sliding portion 44 can not only provide guidance when the telescopic tube 41 moves, but also can transmit the torque that enables the driving sleeve 2 to drive the telescopic tube 41 to rotate synchronously. In order to prevent the telescopic tube 41 from shaking when moving downward, the chute 441 is provided along an axial direction of the telescopic tube 41, and at least two chutes 441 are provided, but not limited hereto.

Referring to FIG. 2, the rice washing and stirring assembly 7 includes a stirring seat 71 connected to the end of the telescopic tube 41 and a stirring blade 72 provided on the stirring seat 71. The stirring seat 71 is connected to the end of the telescopic tube 41 by means including but not limited to threaded connection, pin connection, etc. The stirring blade 72 is detachably connected to the stirring seat 71. The stirring blade 72 can drive the rice grains to fully collide with water, thereby quickly cleaning the rice grains. In order to prevent the stirring blade 72 from rubbing against the container and damaging a coating inside the container, the stirring blade 72 is made of food-grade plastic or rubber, but not limited hereto.

Further, the stirring seat 71 is axially provided with a through hole 711, and the through hole 711 is in communication with the water feeding and draining channel 8. A filter screen 73 is provided in the through hole 711, and the filter screen 73 blocks the rice grains from being sucked into the through hole 711.

Referring to FIG. 2, a water feeding and draining pipes 52 is in communication with an external pipe, and water is fed into or drained from the container through a power element 51. In order to facilitate the fixing the water feeding and draining pipe 52, an upper end of the hollow lead screw 43 extends through the fixing tube 1, the water feeding and draining pipe 52 is received in the hollow lead screw 43, and the water feeding and draining pipe 52 is provided with a second sealing groove 521. A sealing ring 9 is arranged in the second sealing groove 521, so as to achieve sealing between the water feeding and draining pipe 52 and hollow lead screw 43. The hollow lead screw 43 is also fixed with a lock nut 10 which can provide a certain locking force, so as to prevent the water feeding and draining pipe 52 from being loosened from the hollow lead screw 43.

Correspondingly, the present disclosure also provides a rice washing process using the combined rice-washing device, which includes the following steps.

S1, the control assembly 6 controls the driving assembly 3 to start, and the driving sleeve 2 rotates synchronously to drive the telescopic tube 41 to rotate at a first speed V1.

The control assembly 6 controls a rotating speed of the driving sleeve 2 by controlling a rotating speed of the motor 31, and then controls a rotating speed of the telescopic tube 41 and the lead screw nut 42. The telescopic tube 41 will move up and down at a corresponding speed based on determined parameters of hollow lead screw 43 and lead screw nut 42. When a predetermined water feeding position is not reached, the telescopic tube 41 and the lead screw nut 42 rotate at the first speed V1, so that the telescopic tube 41 quickly descends to the predetermined water feeding position, which reduces an overall time required for the rice washing process.

S2, the lead screw nut 42 slides downward along the hollow lead screw 43, the telescopic tube 41 is driven to slide downward relative to the driving sleeve 2 until the rice washing and stirring assembly 7 descends to a predetermined height.

It should be noted that, in order to prevent water from splashing when feeding water, the control assembly 6 may control said telescopic tube 41 to descend to a predetermined position according to the amount of rice to be cooked.

S3, the control assembly 6 controls the water feeding and draining assembly 5 to start and feed a predetermined amount of water into the container.

After the telescopic tube 41 descends to the water feeding position, the control assembly 6 controls the power element 51 to start and feed water to the container, and the amount of the fed water can be adjusted accordingly according to the predetermined amount of water. When the predetermined amount of water is fed, the control assembly 6 will control the power element 51 to stop operating.

S4, the control assembly 6 controls the driving assembly 3 to enable the telescopic tube 41 to rotate at a second speed V2, so that the rice washing and stirring assembly 7 rotates and lifts synchronously to perform one rice washing.

While the power element 51 is feeding water to the container, the control assembly 6 regulates a rotating speed of the motor 31, so that the telescopic tube 41 rotates at a second speed V2, wherein the second speed V2 is less than the first speed V1. When rotating at the second speed V2, the rice washing and stirring assembly 7 can fully stir the rice grains while avoiding damage to the rice grains due to too fast rotating speed, thereby improving the taste of the rice. As needed, the control assembly 6 may also drive the telescopic tube 41 to reciprocate up and down by controlling the forward rotation and reverse rotation of the motor 31, thereby washing the rice grains multiple times. It should be noted that, when the washing is completed, the telescopic tube 41 is located at the lowest position, so that the water in the container can be thoroughly drained.

S5, after one rice washing is completed, the control assembly 6 controls the water feeding and draining assembly 5 to start and drain the water from the container.

Specifically, after one rice washing is completed, the control assembly 6 controls the power element 51 to start to drain the water from the container quickly, so as to avoid soaking the rice grains for a long time and to improve the washing efficiency.

S6, steps S3 to S5 are repeated until the rice washing is finished, and the control assembly 6 controls the telescopic tube 41 to reset.

Specifically, according to a number of times of rice washing configured by a program, the control unit 6 controls the water feeding and draining assembly 5 to feed and drain water multiple times, and the telescopic tube 41 is controlled by the driving assembly 3 to perform multiple reciprocating lifting and rotating movements to complete the washing of rice grains. After washing, the control assembly 6 drives the driving sleeve 2 to reversely rotate through the motor 31, so that the telescopic tube 41 is retracted to the initial position, and the rice washing is completed.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention.

What is claimed is:

1. A combined rice-washing device of a rice cooking robot, comprising a fixing tube, a driving sleeve received in the fixing tube, a driving assembly configured to drive the driving sleeve to rotate, a telescopic assembly slidable relative to the driving sleeve, a water feeding and draining assembly connected to the telescopic assembly, and a control assembly configured to control the driving assembly and the water feeding and draining assembly;

wherein the telescopic assembly comprises a telescopic tube slidably connected to the driving sleeve, a lead screw nut connected to an inner wall of the telescopic tube, and a hollow lead screw cooperating with the lead screw nut; a guide sliding portion is provided between the telescopic tube and the driving sleeve, and an end of the telescopic tube is connected to a rice washing and stirring assembly;

wherein the hollow lead screw is provided with a sealing groove, and a sealing member abutting against the telescopic tube is provided in the sealing groove.

2. The combined rice-washing device of the rice cooking robot according to claim 1, wherein an outer wall of the driving sleeve is provided with a gear ring, and the driving assembly comprises a motor and a gear assembly driven by the motor, and the gear ring is provided in cooperation with the gear assembly.

3. The combined rice-washing device of the rice cooking robot according to claim 2, wherein the gear assembly comprises a worm connected to the motor, a worm gear engaged with the worm, a first gear coaxially arranged with the worm gear, and a second gear engaged with the first gear, and the second gear is engaged with the gear ring.

4. The combined rice-washing device of the rice cooking robot according to claim 3, wherein a lower end of the fixing tube is provided with a mounting sleeve, the mounting sleeve is provided with a notch, and the second gear is engaged with the gear ring through the notch; a side of the mounting sleeve is provided with a mounting platform, and the mounting platform is provided with a plurality of mounting shafts configured to mount the worm gear, the first gear, and the second gear.

5. The combined rice-washing device of the rice cooking robot according to claim 2, wherein the guide sliding portion comprises a chute provided on an inner wall of the driving sleeve and a slider provided on an outer wall of the telescopic tube, the chute is provided in cooperation with the slider.

6. The combined rice-washing device of the rice cooking robot according to claim 5, wherein the chute is provided along an axial direction of the telescopic tube, and at least two chutes are provided.

7. The combined rice-washing device of the rice cooking robot according to claim 1, wherein the rice washing and stirring assembly comprises a stirring seat connected to the end of the telescopic tube and a stirring blade provided on the stirring seat.

8. The combined rice-washing device of the rice cooking robot according to claim 7, wherein the stirring seat is axially provided with a through hole, and a filter screen is provided in the through hole.

9. The combined rice-washing device of the rice cooking robot according to claim 1, wherein the water feeding and draining assembly comprises a power element and a water feeding and draining pipe, and the hollow lead screw extends through the fixing tube and is in communication with the water feeding and draining pipe, and the water feeding and draining pipe is connected to the hollow lead screw.

10. A rice washing process using the combined rice-washing device according to claim 1, comprising the following steps of:
   S1, controlling, by the control assembly, the driving assembly to start, and rotating the driving sleeve synchronously to drive the telescopic tube to rotate;
   S2, sliding, by the lead screw nut, downward along the hollow lead screw, driving the telescopic tube to slide downward relative to the driving sleeve until the rice washing and stirring assembly descends to a predetermined height;
   S3, controlling, by the control assembly, the water feeding and draining assembly to start, and feeding a predetermined amount of water into a container;
   S4, controlling, by the control assembly, the driving assembly to enable the telescopic tube to rotate, enabling the rice washing and stirring assembly to rotate and lift synchronously to perform one rice washing;

S5, after one rice washing is completed, controlling, by the control assembly, the water feeding and draining assembly to start, and draining the water in the container; and S6, repeating steps S3 to S5 until the rice washing is finished, and controlling, by the control assembly, the telescopic tube to reset.

\* \* \* \* \*